(No Model.)
W. GRISCOM.
SHAFT COUPLING.
No. 548,191. Patented Oct. 22, 1895.
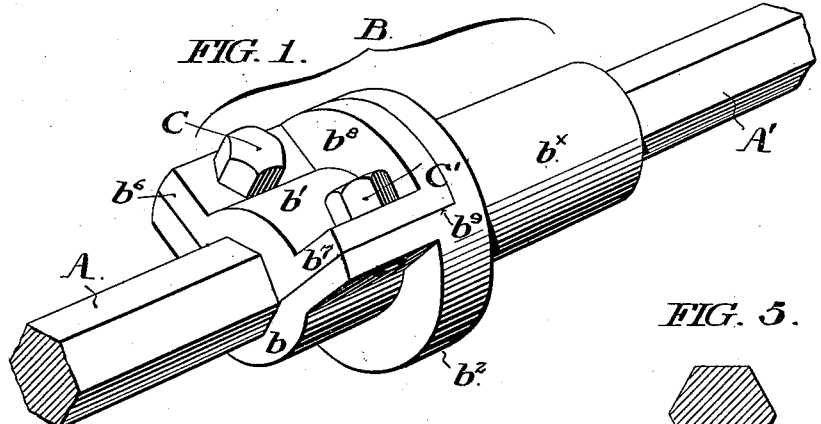
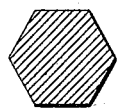
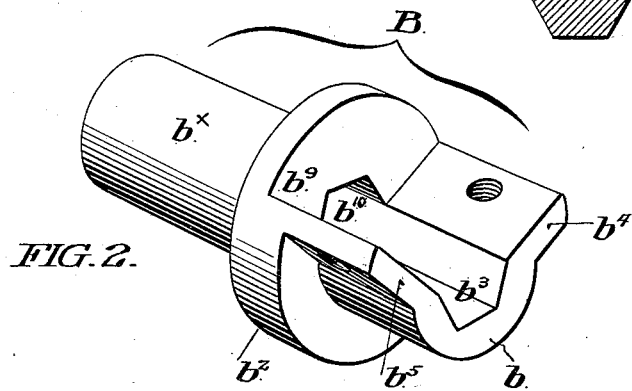
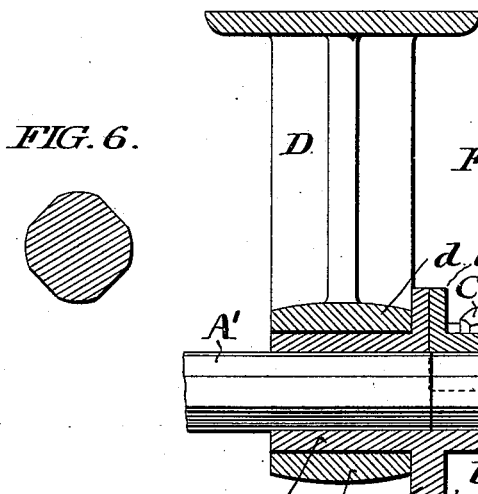
WITNESSES:
N. E. Paige
F. Norman Dixon
INVENTOR:
Walter Griscom
By his Attorneys,
Wm C. Strawbridge
D Bonsall Taylor

UNITED STATES PATENT OFFICE.

WALTER GRISCOM, OF PHILADELPHIA, PENNSYLVANIA.

SHAFT-COUPLING.

SPECIFICATION forming part of Letters Patent No. 548,191, dated October 22, 1895.

Application filed February 12, 1895. Serial No. 538,083. (No model.)

*To all whom it may concern:*

Be it known that I, WALTER GRISCOM, a citizen of the United States, residing in the city and county of Philadelphia, in the State of Pennsylvania, have invented certain new and useful Improvements in Shaft-Couplings, of which the following is a specification.

My invention relates to the well-known class of devices employed to unite adjacent or abutting extremital portions of axially-aligned sections or lengths of shafting.

It is the object of my invention to provide a mechanically simple and inexpensive coupling adapted not only to unite the ends of adjacent sections of shafting, but also to afford means for journaling said united shafts with reference to a supporting-hanger, to the end that the space upon the shaft as an entirety otherwise independently occupied by the hanger-bearing may be economized, and to the further end that, while exact alignment is effected, the sections of shaft to be coupled may be independently applied to and connected up by means of the coupling without, when so desired, removing said coupling from its bearing in the hanger.

In the accompanying drawings I have represented, and herein I describe, a coupling embodying my improvements, the particular subject-matter which I claim as novel being definitely specified in the claiming clauses.

In the drawings, Figure 1 is a view in perspective of a coupling complete as applied to the shaft-sections. Fig. 2 is a similar view of the coupling proper with the shaft-sections and the cover member of the coupling-box removed. Fig. 3 is a central longitudinal sectional elevation of the complete coupling shown in Fig. 1 applied to and sustained by a hanger. Figs. 4, 5, and 6 are cross-sectional views of shaft-sections of different forms.

Similar letters of reference indicate corresponding parts.

In Figs. 1 and 3 of the drawings, A A' represent adjacent sections of shafting shown as united by a coupling embodying my improvements.

B is my coupling proper, consisting, essentially, of a longitudinally centrally-divided and axially-hollow coupling-box composed of two relatively separable members $b\ b'$, in combination with an axially-hollow journal $b^x$, aligned with the coupling-box, and as to its hollow interior preferably correspondent with and continuous of the interior of said box.

$b^2$ is an outwardly-extending circumferential collar, preferably formed integral with the journal and with one member of the journal-box and intermediate between them, which I find it convenient to employ.

By a reference to Fig. 2 it will be perceived that the basal member $b$ of the journal-box proper is formed integral with both the collar $b^2$ and the journal $b^x$ and that that portion or half of its hollow interior or bore $b^3$ which is shown in Fig. 2 is aligned with the hollow interior or bore $b^{10}$ of the journal, which latter extends through the flange $b^2$. It will also be apparent that the bore of the basal member of the box is of but one-half the diametric extent or dimensions of the complete bore of the journal and that it requires the application of the upper or cover member $b'$, Fig. 1, to complete it as a continuous laterally-inclosed recess or hollow bore strictly as such. It will also be apparent that the basal member $b$ of the box is provided with a pair of preferably outwardly-angled longitudinally-extending flanges $b^4\ b^5$, preferably flush at their outer ends with the outer end of said basal member and at their inner ends shown as abutting against or merging into the circumferential collar $b^2$. The function of these flanges is to make contact with and be secured to a pair of correspondingly-disposed substantially counterpart angled flanges $b^6\ b^7$, applied to the upper member $b'$ of the box and conveniently, for greater strength, united by a segmental plate $b^8$, preferably corresponding in radial extent to the collar $b^2$ and adapted to be seated in a recess $b^9$, formed in said collar, as indicated in the drawings.

C C' are screw-bolts adapted to effect connection between the flanges of the cover member and those of the basal member of the coupling-box as an entirety.

The hollow interiors of the coupling-box and journal being of other than cylindrical form—that is to say, being, for instance, of the hexagonal form shown in Figs. 1, 2, and 3, and the exteriors of the sections of shafting to be united being of correspondent form, so as to be incapable of rotation within them—coupling of the shafts is readily effected when the end of the shaft-section A, for instance, has been introduced within the coupling-box proper (as it can conveniently be by dropping it into the basal member when the cover member has been removed) and has been secured therein by the application and fastening of said cover member, and when the end of the shaft member A' has been introduced within the hollow bore of the journal $b^x$, as it can conveniently be by end to end application.

Although I do not restrict myself to any particular external form of the ends of the shafting to be united or to any particular internal form to the bores of the coupling-box and journal, although such latter forms must of course be correspondent to those of the shaft-sections, I yet find it convenient to employ either a hexagonal form, as shown in Figs. 1, 2, 3, and 5, or such a form as is represented of a shaft shown in cross-section in Fig. 6, and which is the subject of an application for patent filed by me February 12, 1895, as Serial No. 538,082, and which form is that of a cylinder with flattened longitudinal extending surfaces, segments of the cylinder being supposed removed. In addition to these forms, however, any irregular but correspondent conformation may be given to the shaft-sections and the hollow interior of the coupling as an entirety, or indeed, if desired, the shaft may be cylindrical, as shown in Fig. 4, and the interior of the coupling correspondingly cylindrical, in which form, however, a key and key-seat, feather, or kindred contrivance must be resorted to.

D, Fig. 3, is the hanger, the bearing-box $d$ of which is conformed to receive and support the journal $b^x$ of the coupling, which is adapted to be rotated freely within it and to be prevented from longitudinal movement with respect to it by the collar $b^2$.

Having thus described my invention, I claim—

1. A shaft-coupling for uniting sections of axially aligned shafting,—which consists of a hollow cylindriform sleeve adapted to receive one section of the shafting to be coupled and to serve as a journal for a shaft-supporting hanger,—and of a hollow coupling box continuous of and permanently connected with said hollow sleeve, and formed of two relatively separable members, and adapted to receive the other section of the shafting,—substantially as set forth.

2. A shaft-coupling for uniting sections of axially aligned shafting,—which consists of a hollow cylindriform sleeve adapted to receive one section of the shafting to be coupled and to serve as a journal for a shaft-supporting hanger,—of a hollow coupling box continuous of and permanently connected with said hollow sleeve, and formed of two relatively separable members, and adapted to receive the other section of the shafting,—and of a circumferential radially projecting collar intermediate said sleeve and coupling box,—substantially as set forth.

3. A shaft-coupling for uniting sections of axially aligned shafting,—which consists of a hollow cylindriform sleeve adapted to receive one section of the shafting to be coupled and to serve as a journal for a shaft-supporting hanger,—and of a hollow coupling box continuous of and permanently connected with said hollow sleeve, and formed of two relatively separable members, adapted to receive the other section of the shafting, and respectively provided with corresponding pairs of projecting flanges adapted to be connected together,—substantially as set forth.

4. A shaft-coupling for uniting sections of axially aligned shafting,—which consists of a hollow cylindriform sleeve adapted to receive one section of the shafting to be coupled and to serve as a journal for a shaft supporting hanger,—of a hollow coupling box continuous of and permanently connected with said hollow sleeve, and formed of two relatively separable members, and adapted to receive the other member of the shafting,—of a circumferential radially projecting collar intermediate of the sleeve and the coupling box,—of outwardly projecting side flanges on one member of the coupling box merging into said collar,—of corresponding side flanges on the other member of the coupling box facing the flanges first named,—and of means for uniting the facing flanges of the respective members,—substantially as set forth.

In testimony that I claim the foregoing as my invention I have hereunto signed my name this 6th day of February, A. D. 1895.

WALTER GRISCOM.

In presence of—
J. BONSALL TAYLOR,
F. NORMAN DIXON.